United States Patent
Catteau et al.

(10) Patent No.: US 8,763,264 B2
(45) Date of Patent: Jul. 1, 2014

(54) INTERFACE AND A METHOD FOR MOUNTING TOGETHER A PIECE OF EQUIPMENT AND A ROTARY DRIVE SOURCE IN A ROTORCRAFT POWER PLANT

(71) Applicant: Eurocopter, Marignane (FR)

(72) Inventors: Jean-Sebastien Catteau, Aix en Provence (FR); Manil Merzoud, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/760,273

(22) Filed: Feb. 6, 2013

(65) Prior Publication Data

US 2013/0200231 A1    Aug. 8, 2013

(30) Foreign Application Priority Data

Feb. 7, 2012 (FR) ...................................... 12 00355

(51) Int. Cl.
  *G01B 5/24*    (2006.01)
(52) U.S. Cl.
  USPC .................................. 33/412; 29/464; 403/13
(58) Field of Classification Search
  USPC .............. 248/220.21, 222.52; 180/53.1, 53.3, 180/53.8; 403/13, 14; 29/271, 272, 281.5, 29/426.3, 464–468; 33/412, 645; 269/43
  See application file for complete search history.

(56) References Cited

U.S. PATENT DOCUMENTS

| | | | |
|---|---|---|---|
| 2,638,676 A * | 5/1953 | Callahan | ........................ 33/412 |
| 4,372,517 A | 2/1983 | Welch | |
| 4,541,163 A * | 9/1985 | Eiting | ........................ 29/464 X |
| 5,056,237 A * | 10/1991 | Saunders | ........................ 33/645 |
| 6,094,797 A | 8/2000 | Sherman | |

FOREIGN PATENT DOCUMENTS

DE    102007059820 A1    6/2009

OTHER PUBLICATIONS

Search Report and Written Opinion; Application No. FR 1200355; dated Nov. 29, 2012.

* cited by examiner

*Primary Examiner* — Gregory Binda
(74) *Attorney, Agent, or Firm* — Brooks Kushman P.C.

(57) ABSTRACT

An interface and a method for mounting a piece of equipment (5) with a rotary drive source (3). The mounting interface has a first frame (1) fastened to the drive source (3) and a second frame (2) fastened to the piece of equipment (5), the frames (1, 2) being fitted with assembly means (19) for assembling them together. Rails (22, 23) for guiding the piece of equipment (5) are removably mounted on the first frame (1) and co-operate with windows (20, 21) of the second frame (2). The windows (20, 21) are laterally open providing transverse passages for the rails (22, 23) into the windows (20, 21). The piece of equipment (5) can be moved transversely by an operator towards the rails (22, 23) in order to support it and guide it axially towards the drive source (5).

14 Claims, 2 Drawing Sheets

INTERFACE AND A METHOD FOR MOUNTING TOGETHER A PIECE OF EQUIPMENT AND A ROTARY DRIVE SOURCE IN A ROTORCRAFT POWER PLANT

CROSS REFERENCE TO RELATED APPLICATIONS

This application claims priority to French patent application No. FR 12 00355 filed on Feb. 7, 2012, the disclosure of which is incorporated in its entirety by reference herein.

BACKGROUND OF THE INVENTION (1) Field of the Invention

The present invention relates to the field of arrangements in rotorcraft concerning mechanisms for assembling a rotary drive source together with a piece of equipment in rotary engagement with said drive source. The drive source is provided in particular with a drive shaft that is to be in rotary engagement with a shaft of the piece of equipment.

(2) Description of Related Art

The rotary drive source comprises a power plant having at least one engine, such as a turbine engine that also contributes to providing the rotorcraft with support and possibly also propulsion.

By way of example, the piece of equipment may be a reversible electrical machine, and more particularly an alternator-starter.

By way of example, another piece of equipment may be a cooling apparatus, a fluid circulation radiator or the like. By way of example, another piece of equipment may be a gearbox forming a secondary drive source for driving an accessory of the rotorcraft, and constituting secondary equipment that is driven by a main gearbox.

Other applications of the assembly mechanism are possible, such as interposing an assembly mechanism between a drive source formed by a main gearbox of a power plant and a piece of equipment formed by an accessory of the rotorcraft.

The main power plant in a rotorcraft is housed in compartments formed on a frame of the rotorcraft, where such a frame is sometimes referred to as a "transmission support platform".

A rotorcraft may be fitted with a single power plant, but it is potentially fitted with two power plants. Under such circumstances, the power plants are housed in respective compartments arranged side by side.

It is commonly desired to limit the size of the two compartments on the rotorcraft in order to reduce their volume. The space available around the power plant installed inside such a compartment is restricted at best. This makes it difficult to access the various members making up the power plant, thus making maintenance operations difficult.

BRIEF SUMMARY OF THE INVENTION

An objective to be achieved is to facilitate access by an operator to the various members of the power plant in order to be able to perform maintenance operations at lower costs, at any location, and by an isolated operator working alone. Such maintenance operations include in particular maintaining pieces of equipment.

In a rotorcraft having a plurality of power plants, the power plant presents respective architectures that are similar and they are arranged side by side in the same orientation, while being housed in respective compartments. Such similarities of structure and of position give rise to difficulties of access that are selective due to a mirror effect on analogous members included in the respective power plants. The compartments are commonly available to an operator from beneath, which makes it more or less difficult to access the same respective functional members in the power plants.

The concept of avionics elements that constitute line replaceable units (LRUs) has been developed. LRUs are functional structures of a mechanical or electronic unit that are individually installable on carrier frames, thereby making maintenance operations easier at a stopover. In the context of rotorcraft power plants, such functional structures correspond to pieces of equipment grouped together with the turbine engine.

Maintaining such pieces of equipment remains difficult because they are installed close to one another and in the proximity of the walls of the compartment, or indeed because of their weight, which makes them difficult for an operator to handle alone. Thus, the volume of the compartment is congested by the functional units that make them difficult for such an operator to access individually and that consequently increase the time required for maintenance. That goes against the requirements of users.

The concept of commercial off-the-shelf (COTS) components has also been developed, which concept favors using standardized components in order to reduce waiting times and also manufacturing and maintenance costs of such components. It is appropriate to take advantage of this concept when designing a mechanical unit.

Another concept that has been developed is that of mounting interfaces for use between members that are to be assembled together, where such interfaces of the quick attach/detach (QAD) type. Such mounting interfaces make use of frames that are allocated to and fastened on respective ones of the members for assembling together, and means enabling said frames to co-operate with one another so as to be joined together. The fastening of the frames on the members to which they are allocated and the co-operation between frames need to comply with the requirements for assembling said members together.

In the context of organizing the way a piece of equipment is mounted with a rotary drive source for driving the equipment, it is appropriate to take account of the various above-mentioned concepts (LRU, COST, QAD) and to satisfy their requirements. It is also appropriate to limit or standardize the tooling that needs to be used for performing maintenance operations on pieces of equipment.

Structures are known for mounting a piece of equipment on a rotary drive source that tend to satisfy such constraints. Reference may be made for example to the following documents: U.S. Pat. No. 6,094,797 (Aircraft Parts Corp.), and U.S. Pat. No. 4,372,517 (Lockheed Corp.). The solutions proposed are not fully satisfactory and need to be improved.

From document DE 10 2007 059820 (Innovative Windpower AG), it is also known to make use of removable rails in the context of centering components for assembly relative to one another that form parts of an electrical machine installed in a wind turbine nacelle.

The object of the present invention is to propose an interface and a method for mounting together a piece of equipment and a rotary drive source forming part of a power plant of a rotorcraft.

The present invention seeks more particularly to propose such a mounting interface and such a mounting method that provides a good solution to the above-mentioned maintenance constraints and requirements.

The interface of the invention is an axial mounting interface between a piece of equipment and a rotary drive source for driving the equipment in rotation. Said interface comprises a first frame provided with first fastener means for fastening to the drive source and a second frame provided with second fastener means for fastening to the equipment. Said interface comprises assembly means between the first frame and the second frame in order to hold them together. In addition, the interface is fitted with centering means for centering the first and second frames relative to each other.

The centering means comprise at least two mounting shafts carried in parallel by the first frame in an axial orientation. The mounting shafts co-operate with respective windows included in the second frame, with the mounting shafts passing through said windows.

The frames are generally plane, being essentially arranged as plates or the like designed to be superposed in the mounted position with the equipment engaged on the drive source. The overall shape of the frames allows them to be installed so that they are axially superposed and centered respectively on the drive source and on the piece of equipment. The frames have respective middle axes extending substantially perpendicularly to their general planes, said middle axes corresponding to the axis of rotation of the drive source and of the piece of equipment when they are assembled together in rotary engagement. A said axial orientation corresponds to an orientation parallel to the general direction in which said middle axes and said axis of rotation extend when the equipment is in a mounted situation on the drive source.

The interface of the present invention is mainly recognizable in that the mounting shafts are arranged as rails for supporting and axially guiding the second frame relative to the first frame. Said rails are elements that are distinct from the first frame, with the rails being suitable for being installed on and removed from the first frame. More particularly, the rails are removably mounted on the first frame by easily-reversible junction means. The rails co-operate with open windows in the second frame. The openings of said windows open out to allow the rails to pass transversely into respective ones of the windows from outside the second frame.

The removable nature of the rails is such as to enable them to be attached to the first frame during mounting and/or separation of the drive source and the piece of equipment relative to each other, and to be removed when the piece of equipment and the drive source are indeed in a mounted situation. The removable nature of the rails and the open nature of the windows allow the rails to extend in an axial orientation without subsequently getting in the way when the piece of equipment is indeed mounted on the drive source. The removable nature of the rails and the open nature of the windows make the second frame that carries the piece of equipment suitable for engaging the rails by moving transversely relative to any axial zone along the rails.

The second frame is suitable for being carried by the rails and for sliding along the rails from any axial starting position in the direction in which the rails extend. The equipment carrying the second frame can be moved up to the rails in a direction extending transversely to the middle axis of the first frame and more particularly to the axis of rotation of the drive source. Such an approach is finalized by engaging the second frame on the rails in any said axial position along them, thereby supporting the piece of equipment and relieving the operator of its weight.

It should be considered that the structure of the mounting interface excludes integrating said rails with the first frame. The rails that are removably mounted on the first frame are suitable for being fitted to or removed from the mounting interface, selectively for the purpose of performing the operations of mounting and of separating the piece of equipment relative to the drive source and for releasing the interface of the space they occupy.

In an advantageous embodiment, a window provides a pivoting rest for supporting the equipment. Another window provides an abutment rest against said pivoting.

The operator makes use of one window to place the piece of equipment so that it is supported on a corresponding rail without being impeded by any obstacle by using a said approach that is transverse relative to the axis of rotation of the drive source fitted with the first slab. Once relieved of the weight of the piece of equipment, the operator then accompanies it in pivoting until the piece of equipment comes into abutment resting against the other rail, which then passes through the corresponding window by means of the opening that it includes.

In a non-preferred extreme embodiment, the window providing the abutment rest need be no more than a plane against which the rail bears. Nevertheless, it is preferable to form such an abutment window as a member that supports the second frame carrying the piece of equipment in co-operation with the other window so as to avoid the equipment being arranged skew and jamming axially while it is sliding along the rails.

In a preferred embodiment, the rails are mounted on first radially peripheral lugs of the first frame. The windows are arranged in second radially peripheral lugs of the second frame. Given the structure of the mounting interface, these first and second lugs are arranged in axial superposition when the drive source and the piece of equipment are in the mounted situation and in rotary engagement.

More particularly, a second support lug of the equipment is arranged as a hook. A second pivoting abutment lug of the equipment is arranged as a stop. The respective hook and stop arrangements of the second support lugs are derived from the openings and the shapes of these second windows arranged in said second lugs, respectively the support second lug and the abutment second lug.

Advantage is taken of the second windows and the first windows being put into superposition when the drive source and the piece of equipment are in the mounted situation in order to incorporate said assembly means in the lugs. It should be understood that a set comprising at least one first auxiliary lug and at least one second auxiliary lug, not having either rail junction means or windows, could be used for improving mutual retention between the first frame and the second frame by the assembly means.

More particularly, said assembly means comprise means for mutually engaging facing first and second lugs. Such assembly means may for example be of the type providing connection by bolting the first and second lugs together, or by using an analogous screw-fastening technique using a member for providing assembly by axially clamping the first and second lugs together respectively.

In analogous variant embodiments, said easily-reversible junction means are either of the mutual engagement type or of the screw-fastening type. Said engagement may be engagement of the elastically deformable type, possibly associated with or making use of an elastically deformable attachment member engaged both on the rails and on the first frame. The junction means are means that are themselves known for achieving easily-reversible connection between the rails and the first frame, and being sufficiently robust in structure to obtain simple support for the piece of equipment.

The first fastener means are preferably of the screw-fastener type, making use of fastener members that bear in an axial orientation against blocks provided on a plate of the first frame.

By way of example, the second fastener means are of the clamping collar type, or indeed of the screw-fastening type or of the bolting type, or using an analogous technique implementing an assembly member operating by axial and/or radial clamping between the second frame and the piece of equipment.

The present invention also provides a method of assembling together and a method of separating a drive source and a piece of equipment by making use of a mounting interface as described above. One such method is described below, in association with an implementation of the present invention.

The present invention also provides a rotorcraft power plant including at least one drive source in rotary connection with at least one said piece of equipment via a mounting interface as described above.

In various examples, the piece of equipment may either be a reversible electrical machine in rotary engagement on an engine of the power plant or an accessory in rotary engagement on a power transmission gearbox driven by said engine.

The present invention also provides tooling for mounting a piece of equipment forming part of a rotorcraft power plant of the present invention. Such tooling comprises at least a pair of said removable rails used for mounting at least any one piece of equipment in rotary engagement on a drive source allocated thereto. More particularly, for a drive source that is potentially capable of being in rotary engagement with a plurality of pieces of equipment, a single set of rails is advantageously used for mounting various pieces of equipment in rotary engagement on the drive source.

BRIEF DESCRIPTION OF THE SEVERAL VIEWS OF THE DRAWINGS

An embodiment of the present invention is described with reference to the figures of the accompanying sheets, in which.

DETAILED DESCRIPTION OF THE INVENTION

Figure 1:
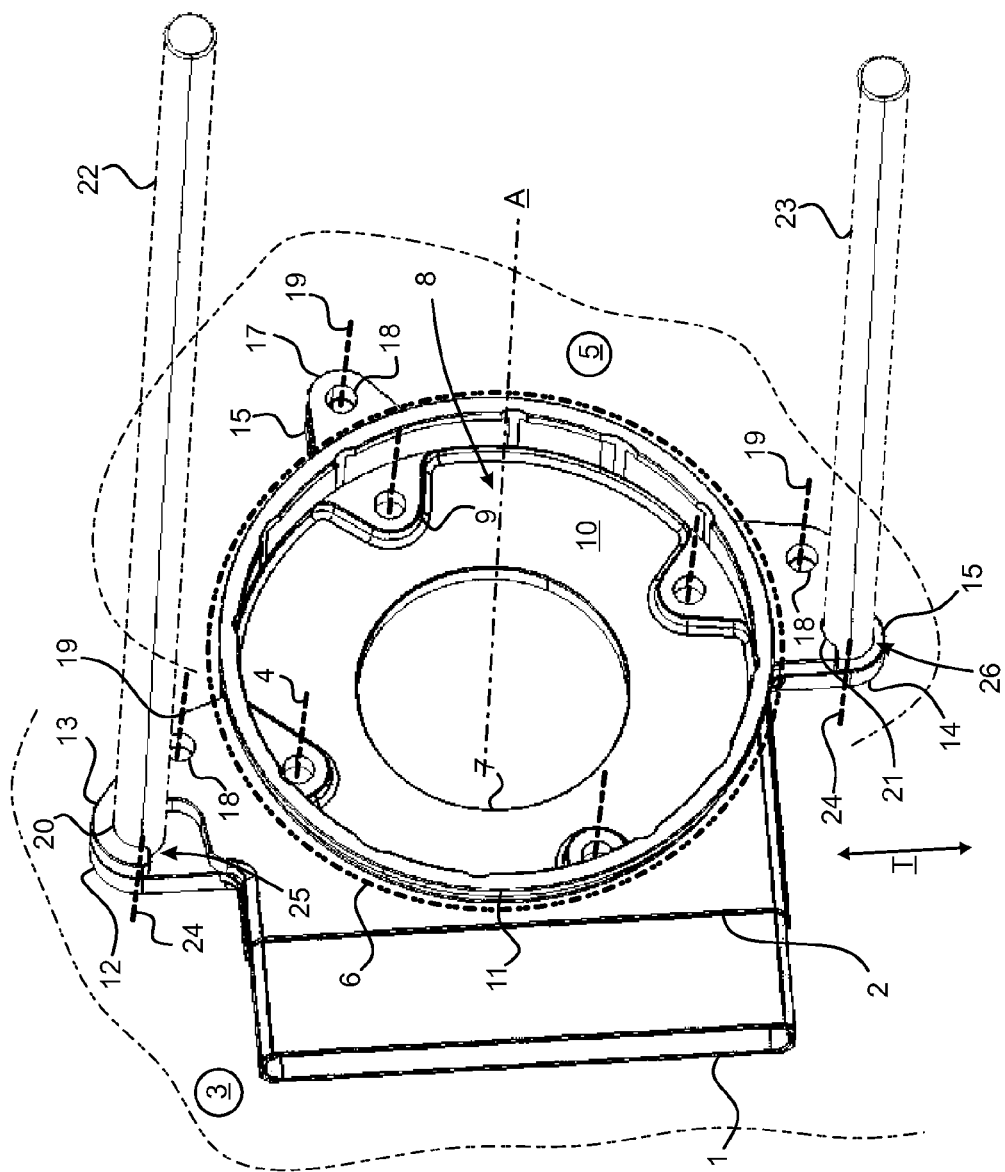
FIG. 1 is a perspective view showing an assembled mounting interface in a preferred embodiment of the present invention.
Figure 2:
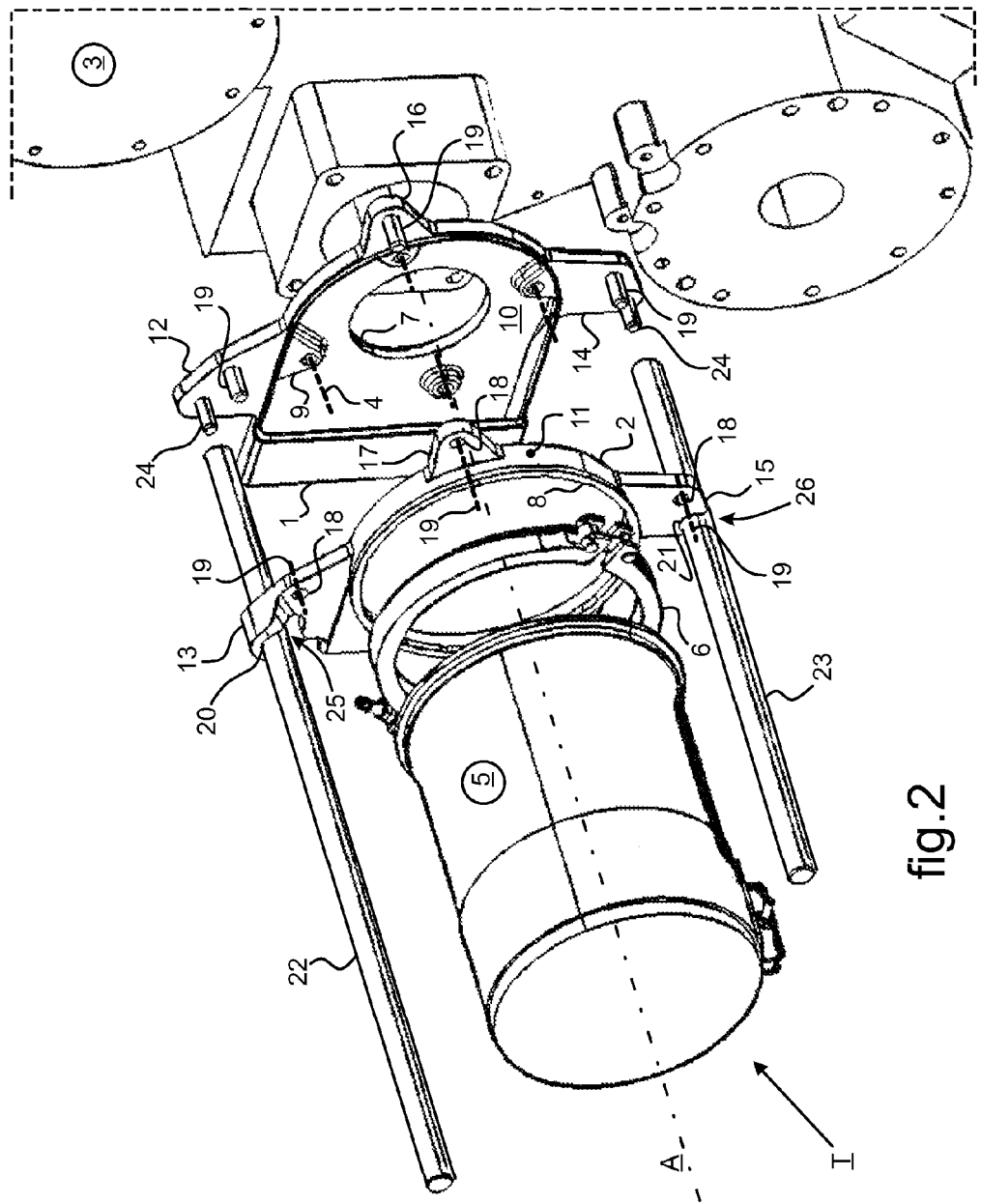
FIG. 2 is an exploded perspective view of a drive source and a piece of equipment assembled together by means of a mounting interface as shown in FIG. 1.

In FIGS. 1 and 2, a mounting interface comprises two generally plane frames 1 and 2 arranged to be fastened together axially. A first frame 1 is for fastening to a drive source 3 by first fastener means 4 of the screw-fastener type. A second frame 2 is for fastening to a piece of equipment 5 by second fastener means 6 of the clamping collar type.

The first frame 1 and the second frame 2 include respective axial openings 7 and 8 for overlying each other when the frames 1 and 2 are assembled together in a situation of axially mounting the equipment 5 on the drive source 3. Such openings 7 and 8 form a passage for a shaft of the equipment 5 in order to enable it to be driven in rotation by a shaft of the drive source 3.

The first fastener means 4 bear against blocks 9 included in the first frame 1. The blocks 9 are arranged on a plate 10 of the first frame 1, at the margins of the axial openings 7 in the first frame 1. The clamping collar forming the second fastener means 6 is engaged both on the equipment 5 and on a peripheral band 11 forming part of the second frame 2.

The frames 1 and 2 have peripheral radially-extending lugs 12, 14, 16 and 13, 15, 17 respectively having through orifices 18 for passing assembly means 19 such as fastener bolts or screw-receiving sleeves, or the like. In a situation in which the equipment 5 is axially mounted on the drive source 3, the first lugs 12, 14, 16 of the first frame 1 overlie and bear axially against corresponding second lugs 13, 15, 17 of the second frame 2. The assembly means 19 serve to hold the equipment 5 having the second frame 2 against the drive source 3 having the first frame 1.

The second frame 2 has a support lug 13 and an abutment lug 15 each provided with windows 20, 21 for passing rails 22, 23. The rails 22, 23 are retractable tools of the mounting interface, which includes tooling for mounting the equipment 5 on the drive source 3. Easily-reversible junction means 24, e.g. screw-fastener means, serve to mount the rails 22 and 23 temporarily on the first frame 1. The windows 20, 21 open out laterally, with the respective lateral openings 25 and 26 of the windows 20, 21 forming transverse passages for the rails 22, 23 through the windows 20, 21 from the outside environment of the second frame. An elongate window 20 is provided in the support lug 13 giving it a hook arrangement. A notching forming the window 21 in the abutment lug 15 gives it a stop arrangement as a fork for receiving a rail 23.

The mounting interface is used in accordance with a method of assembling a drive source 3 and a piece of equipment 5 by an operator performing the following operations:

fastening the first frame 1 and the second frame 2 respectively to the drive source 3 and to the piece of equipment 5, respectively by using the first fastener means 4 and the second fastener means 6, the drive source 3 and the piece of equipment 5 advantageously being fitted respectively with the first frame 1 and the second frame 2 in a workshop;

joining the rails 22 and 23 to the first frame 1 by using the easily-reversible junction means 24;

moving the piece of equipment 5 fitted with the second frame 2 towards the rails 22, 23 in a direction T that is transverse relative to the axial direction A in which the drive source 3 and the piece of equipment 5 extend;

hooking the piece of equipment 5 by gravity on a rail 22 via a support window 20 and allowing the piece of equipment 5 to pivot under the effect of its own weight to bear against the other rail 23 via an abutment window 21, the support window 20 being in particular a window that is considered as being an upper window relative to the transverse direction T for moving the piece of equipment 5 towards the drive source 3 and relative to the radial orientation with which the first frame 1 is mounted on the drive source 3, the abutment window 21 being a window that is arranged to be radially offset relative to the support window 20;

causing the piece of equipment 5 as supported and guided by the rails 22 and 23 to slide from a position in which the first and second frames 1 and 2 are spaced apart from each other towards an assembly position in which the piece of equipment 5 is rotatably engaged on the drive source 3 and in which the first frame 1 and the second frame 2 are axially in contact, said spaced-apart position being considered as being any axial starting position in which the piece of equipment 5 is installed by being supported on the rails 22 and 23;

securing the first and second frames 1 and 2 together by the assembly means 19; and removing the rails 22 and 23 from the first frame 1 by breaking the junction provided by the easily-reversible junction means 24.

The operation of axially sliding the piece of equipment 5 presently comprises the following steps:

bringing the piece of equipment 5 towards the drive source 3 by sliding axially along the rails 22 and 23 until a shaft of the piece of equipment 5 and a shaft of the drive source 3 are in mutual rotary engagement;

when necessary, if there is a radial offset between the drive source 3 and the piece of equipment 5, moving the piece of equipment axially away from the drive source 3 and turning the shaft of the piece of equipment 5 so as to adjust its radial position, said axial spacing being sufficient to allow a tool to be passed between the first and second frames 1 and 2 in order to enable an operator to turn the shaft of the piece of equipment 5, such a tool being suitable for being formed by a specific instrument and/or by the operator's hand; and repeating said step of axially sliding the piece of equipment 5 towards the drive source 3 and in the event of achieving rotary engagement, finalizing the axial approach of the piece of equipment 5 towards the drive source 3 into the assembled position.

The mounting interface is used to perform a separation operation between the drive source 3 and the piece of equipment 5 by the operator performing the following operations:

sliding the rails 22 and 23 through the corresponding windows 20 and 21 and joining the rails 22 and 23 to the first frame 1 via the easily-reversible junction means 24;

mutually separating the first and second frames 1 and 2 by disengaging the assembly means 19;

pushing the piece of equipment 5 away from the drive source 3 by sliding the equipment 5 axially along the rails 22 and 23; and removing the piece of equipment 5 by unhooking it and moving it away from the drive source 3 in the transverse direction T.

What is claimed is:

1. An axial mounting interface between a piece of equipment and a rotary drive source, said interface comprising:

a first frame provided with first fastener means for fastening to the drive source;

a second frame provided with second fastener means for fastening to the equipment;

assembly means between the first frame and the second frame in order to hold them together; and means for mutually centering the first frame and the second frame, said means comprising at least two mounting shafts carried in parallel by the first frame in an axial orientation, the mounting shafts co-operating with respective windows included in the second frame, wherein the mounting shafts are arranged as rails for supporting and axially guiding the second frame relative to the first frame, said rails being removably mounted on the first frame via easily-reversible junction means and co-operating with open windows in the second frame, the openings of said windows opening out to allow the rails to pass transversely into respective windows from the outside of the second frame, wherein the rails are mounted on first radially peripheral lugs of the first frame, and wherein the windows are arranged in second radially peripheral lugs of the second frame, and wherein a second support lug of the equipment is arranged as a hook and in that a second pivoting abutment lug of the equipment is arranged as a stop.

2. An axial mounting interface between a piece of equipment and a rotary drive source, said interface comprising:

a first frame provided with first fastener means for fastening to the drive source;

a second frame provided with second fastener means for fastening to the equipment;

assembly means between the first frame and the second frame in order to hold them together; and means for mutually centering the first frame and the second frame, said means comprising at least two mounting shafts carried in parallel by the first frame in an axial orientation, the mounting shafts co-operating with respective windows included in the second frame, wherein the mounting shafts are arranged as rails for supporting and axially guiding the second frame relative to the first frame, said rails being removably mounted on the first frame via easily-reversible junction means and co-operating with open windows in the second frame, the openings of said windows opening out to allow the rails to pass transversely into respective windows from the outside of the second frame, wherein one window provides a pivoting rest for supporting the equipment, another window providing an abutment rest against said pivoting.

3. A mounting interface according to claim 2, wherein the rails are mounted on first radially peripheral lugs of the first frame, and wherein the windows are arranged in second radially peripheral lugs of the second frame.

4. A mounting interface according to claim 3, wherein a second support lug of the equipment is arranged as a hook and in that a second pivoting abutment lug of the equipment is arranged as a stop.

5. A mounting interface according to claim 3, wherein said assembly means comprise means for mutually engaging facing first and second lugs.

6. A mounting interface according to claim 3, wherein the assembly means are of the type for providing connection by bolting the first and second lugs together.

7. A mounting interface according to claim 2, wherein said easily-reversible junction means are either of the mutual engagement type or of the screw-fastening type.

8. A mounting interface according to claim 2, wherein the first fastener means are of the screw-fastener type, making use of bearing fastener members in an axial orientation against blocks provided on a plate of the first frame.

9. A mounting interface according to claim 2, wherein the second fastener means are of the clamping collar type.

10. A method of separating a drive source and a piece of equipment implementing a mounting interface according to claim 2, wherein the separation method comprises the following operations:

sliding the rails through the corresponding windows and joining the rails to the first frame via the easily-reversible junction means;

mutually separating the first and second frames by disengaging the assembly means;

pushing the piece of equipment away from the drive source by sliding the equipment axially along the rails; and removing the piece of equipment by unhooking it and moving it away from the drive source in the transverse direction (T).

11. A rotorcraft power plant including at least one drive source in rotary connection with at least one said piece of equipment via a mounting interface according to claim 2.

12. A rotorcraft power plant according to claim 11, wherein the piece of equipment is either a reversible electrical machine in rotary engagement on an engine of the power plant, or an accessory in rotary engagement on a power transmission gearbox.

13. A method of assembling together a drive source and a piece of equipment by using a mounting interface comprising:

a first frame provided with first fastener means for fastening to the drive source;

a second frame provided with second fastener means for fastening to the equipment;

assembly means between the first frame and the second frame in order to hold them together; and means for mutually centering the first frame and the second frame, said means comprising at least two mounting shafts carried in parallel by the first frame in an axial orientation, the mounting shafts co-operating with respective windows included in the second frame, wherein the mounting shafts are arranged as rails for supporting and axially guiding the second frame relative to the first frame, said rails being removably mounted on the first frame via easily-reversible junction means and co-operating with open windows in the second frame, the openings of said windows opening out to allow the rails to pass transversely into respective windows from the outside of the second frame, wherein the assembly method comprises the following operations:

fastening the first frame and the second frame respectively to the drive source and to the piece of equipment, respectively by using the first fastener means and the second fastener means;

joining the rails to the first frame by using the easily-reversible junction means;

moving the piece of equipment fitted with the second frame towards the rails in a direction (T) that is transverse relative to the axial direction (A) in which the drive source and the piece of equipment extend;

hooking the piece of equipment by gravity on a rail via a support window and allowing the piece of equipment to pivot under the effect of its own weight to bear against the other rail via an abutment window;

causing the piece of equipment as supported and guided by the rails to slide from a position in which the first and second frames are spaced apart from each other towards an assembly position in which the piece of equipment is rotatably engaged on the drive source and in which the first frame and the second frame are axially in contact;

securing the first and second frames together by the assembly means; and removing the rails from the first frame by breaking the junction provided by the easily-reversible junction means.

14. An assembly method according to claim 13, wherein the operation of sliding the equipment axially comprises the following steps:

bringing the piece of equipment towards the drive source by sliding axially along the rails until a shaft of the piece of equipment and a shaft of the drive source are in mutual rotary engagement;

when necessary, if there is a radial offset between the drive source and the piece of equipment, moving the piece of equipment axially away from the drive source and turning the shaft of the piece of equipment so as to adjust its radial position; and repeating said step of axially sliding the piece of equipment towards the drive source and in the event of achieving rotary engagement, finalizing the axial approach of the piece of equipment towards the drive source into the assembled position.

* * * * *